US005392065A

United States Patent [19]

Suzuki

[11] Patent Number: 5,392,065

[45] Date of Patent: Feb. 21, 1995

[54] INK JET PRINTER USING HOT MELT INK

[75] Inventor: Shogo Suzuki, Nagoya, Japan

[73] Assignee: Brother Kogyo Kabushiki Kaisha, Nagoya, Japan

[21] Appl. No.: 944,930

[22] Filed: Sep. 15, 1992

[30] Foreign Application Priority Data

Oct. 15, 1991 [JP] Japan .................................. 3-266259
Jun. 12, 1992 [JP] Japan .................................. 4-153587

[51] Int. Cl.[6] .............................................. G01D 15/16
[52] U.S. Cl. .......................................... 347/88; 347/17
[58] Field of Search ................ 346/140 R; 347/88, 17

[56] References Cited

U.S. PATENT DOCUMENTS 3,999,190 12/1976 Brown et al. .................. 346/140 R
4,593,292 6/1986 Lewis .................................. 346/1.1
4,751,528 6/1988 Spehrley, Jr. et al. ......... 346/140 R
4,853,706 8/1989 Van Brimer et al. ............... 346/1.1

FOREIGN PATENT DOCUMENTS 64-11841 7/1987 Japan .
2211471 7/1989 United Kingdom .

*Primary Examiner*—Benjamin R. Fuller
*Assistant Examiner*—Valerie Lund
*Attorney, Agent, or Firm*—Oliff & Berridge

[57] ABSTRACT

An ink jet printer employing a hot melt ink that, during the period of time the hot melt ink stored in an ink tank is molten, displays a message of "INK IS MOLTEN" on an LCD, or otherwise indicates the molten state, so that a user can recognize that the ink jet printer must not be moved. Accordingly, it is possible to prevent a malfunction or failure of the ink jet printer due to the user erroneously moving the ink jet printer with the ink in the ink tank remaining molten thereby spilling liquid ink from the ink tank onto operating components of the ink jet printer.

18 Claims, 13 Drawing Sheets

INK JET PRINTER USING HOT MELT INK

BACKGROUND OF THE INVENTION

1. Field of the Invention

The invention relates to an ink let printer using a hot melt ink and, more particularly, to an ink jet printer which can inform the user of the molten state of the hot melt ink during the period of time while the hot melt ink is molten.

2. Description of Related Art

There exists an ink jet printer for printing characters, figures, etc. on a printing medium using an ink jet head and a hot melt ink, the ink being solid at ordinary temperature and melted by heat. This kind of ink jet printer includes an ink tank provided with a heater for heating the hot melt ink to melt the same so that it can be ejected onto the printing medium. The structure of such an ink tank provided with a heater is described with reference to FIG. 3. For FIG. 3, an ink tank 16 is provided at an upper portion in the ink jet printer 10. The ink tank 16 is provided with an ink supply opening 18 for supplying the hot melt ink in a solid state and a lid 20 for closing the ink supply opening 18. While the lid 20 is provided to prevent dust or the like from entering the ink tank 16 through the ink supply opening 18, the lid 20 is not tightly fitted to the ink supply opening 18.

When the lid 20 is tightly fitted to the ink supply opening 18, the following problems occur. Because the lid 20 closes the ink supply opening 18 of the ink tank 16, the lid 20 becomes very hot. Accordingly, when a user attempts to supply additional hot melt ink into the ink tank 16, it is very hard for the user to open the hot lid 20 that is tightly fitted to the ink supply opening 18. Further, the lid 20 is made of a resin and, as such, it is expanded by heat. Accordingly, when the lid 20 is tightly fitted to the ink supply opening 18 and is subsequently expanded by heat, the user cannot remove the lid 20 from the ink supply opening 18, and the user must delay the supply of the hot melt ink until the lid 20 cools to contract and restore an original shape. For these reasons, the lid 20 is not tightly fitted to the ink supply opening 18, but there is defined a small gap between the lid 20 and the ink supply opening 18 when the lid 20 is closed. Thus, the lid 20 can be easily removed from the ink supply opening 18.

When electric power is supplied, from a commercial power source, to the ink jet printer, the solid hot melt ink supplied through the ink supply opening 18 into the ink tank 16, is heated and melted by the heater and the ink is kept in a molten state. In printing, the molten ink in the ink tank 16 is used for printing on the printing medium using a printing mechanism. Thereafter, when the supply of electric power from the commercial power source to the ink jet printer is stopped, the heater is deenergized and stops heating the hot melt ink. Accordingly, the molten ink returns to a solid state as time passes.

However, if the ink jet printer is moved while the hot melt ink in the ink tank 16 is still in the molten state, after an interruption of the supply of the electric power from the commercial power source to the ink jet printer, there is a possibility that the molten ink in the ink tank 16 will spill from the small gap defined between the lid 20 and the ink supply opening 18. If the molten ink spills out of the ink tank 16, there is a possibility that the spilt ink will adhere to a slit provided to read movement of the ink jet head as an encoder signal. If the spilt ink adheres to the slit and disables the encoder so that it cannot read the movement of the ink jet head, the printing operation cannot be properly controlled. Further, if the spilt ink adheres to mechanical power transmitting parts (e.g., gears) or a supporting portion (e.g., a carriage shaft) for movably supporting the ink jet head, effective power transmission is blunted or the proper movement of the ink jet head is hindered by the adhering ink thus causing a malfunction or failure of the ink jet printer. Furthermore, while the user may move the ink jet printer some time after turning off the supply of the electric power, the user cannot actually determine whether the molten ink in the ink tank has solidified.

SUMMARY OF THE INVENTION

It is accordingly an object of the invention to provide an ink jet printer which can give a warning that the user must not move the ink jet printer during a period of time while the hot melt ink in the ink tank is molten and can inform the user that the hot melt ink has solidified.

The ink jet printer of the invention achieving the above object comprises ink storing means for storing a hot melt ink, warning means for warning a user that the hot melt ink stored in the ink storing means is molten, and control means for operating the warning means for a period of time while the hot melt ink stored in the ink storing means is molten.

According to the ink jet printer of the invention having the above structure, the warning means is controlled to be operated by the control means for the period of time while the hot melt ink stored in the ink storing means is molten thereby warning the user that the hot melt ink stored in the ink storing means is molten.

Accordingly, the user is aware that the ink jet printer must not be moved during the period of time while the hot melt ink stored in the ink storing means is molten thereby precluding spillage of the molten ink from the ink storing means during movement of the ink jet printer.

BRIEF DESCRIPTION OF THE DRAWING

A preferred embodiment of the invention will be described in detail with reference to the following figures, wherein.

DETAILED DESCRIPTION OF THE PREFERRED EMBODIMENTS

Figure 1:
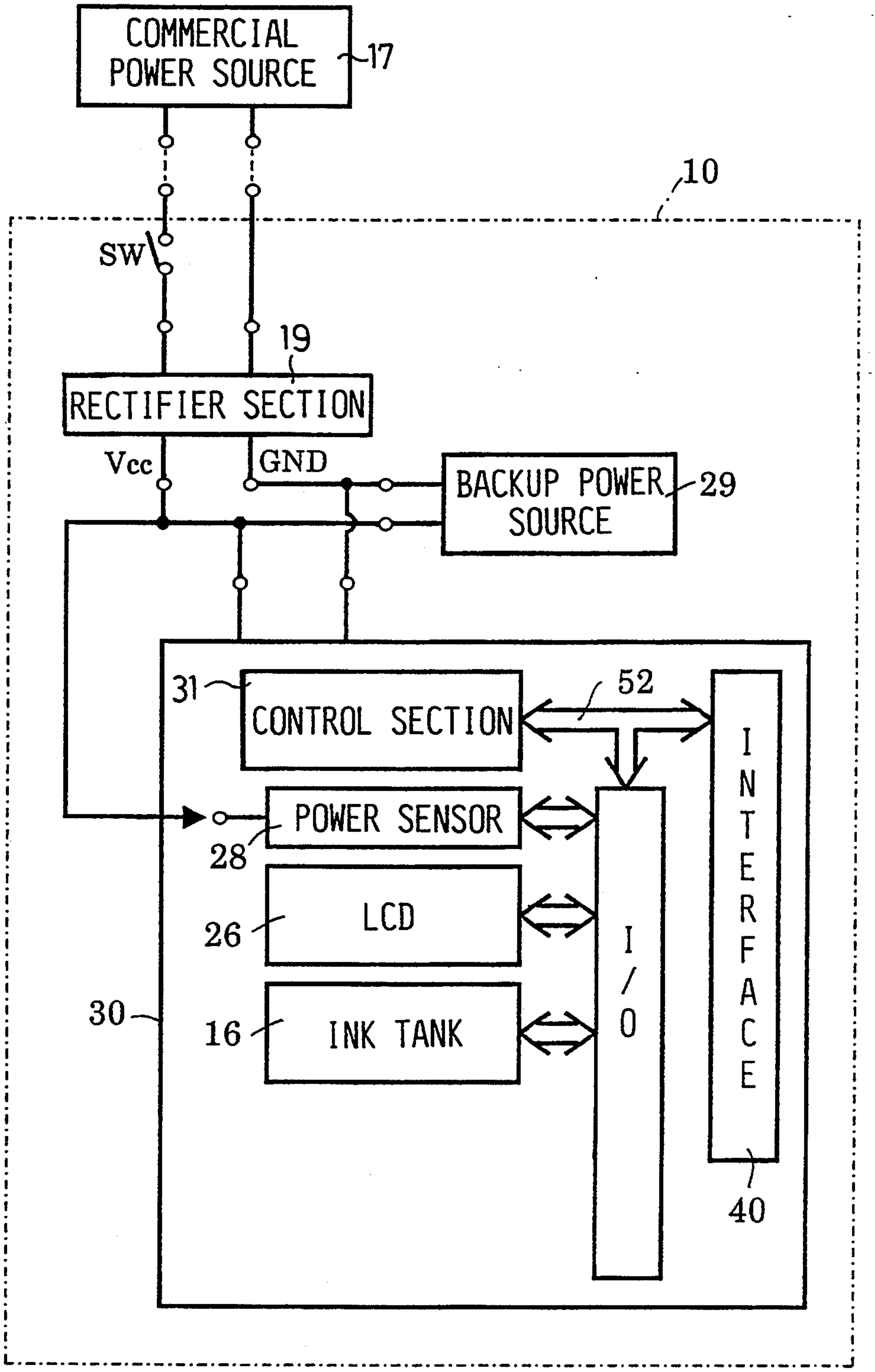
FIG. 1 is a block diagram illustrating an electrical structure of an ink jet printer in a first preferred embodiment according to the invention.

A first preferred embodiment of the invention will be described with reference to the drawings.

First, an exterior structure of the ink jet printer 10 of the first preferred embodiment will be described with reference to FIG. 3. As the exterior structure of the ink jet printer 10 is similar to that of the conventional ink jet printer mentioned previously, the same parts are designated by the same reference numerals. A paper eject opening 12 for ejecting a printing paper 11 (see FIG. 2) after recording is provided at a central portion of the ink jet printer 10 on the upper side thereof. An image, such as characters and/or figures, is recorded on the printing paper 11 by a printing mechanism 14 (see FIG. 2) having a known ink jet head and, thereafter, the printing paper 11 is ejected from the paper eject opening 12 out of the ink jet printer 10. The printing paper 11 for recording is supplied from a paper supply opening 13 to the printing mechanism 14.

Four ink tanks 16 for storing four kinds (cyan, magenta, yellow and black) of hot melt ink (which will be hereinafter referred to as ink) 15 are laterally arranged in line at a left upper portion in the ink jet printer 10 and forward of the paper eject opening 12, as viewed in FIG. 3. Each of the ink tanks 16 is provided with an ink supply opening 18 and a lid 20 for freely opening and closing the ink supply opening 18. As previously mentioned in the Description of Related Art, the lid 20 serves to prevent dust from entering the ink tank 16, through the ink supply opening 18, and the lid 20 is not tightly fitted to the ink supply opening 18 when it is closed. In supplying the ink 15, a user first opens the lid 20 and then supplies the appropriate ink 15, which is in a solid state, through the ink supply opening 18 into each ink tank 16.

Figure 2:
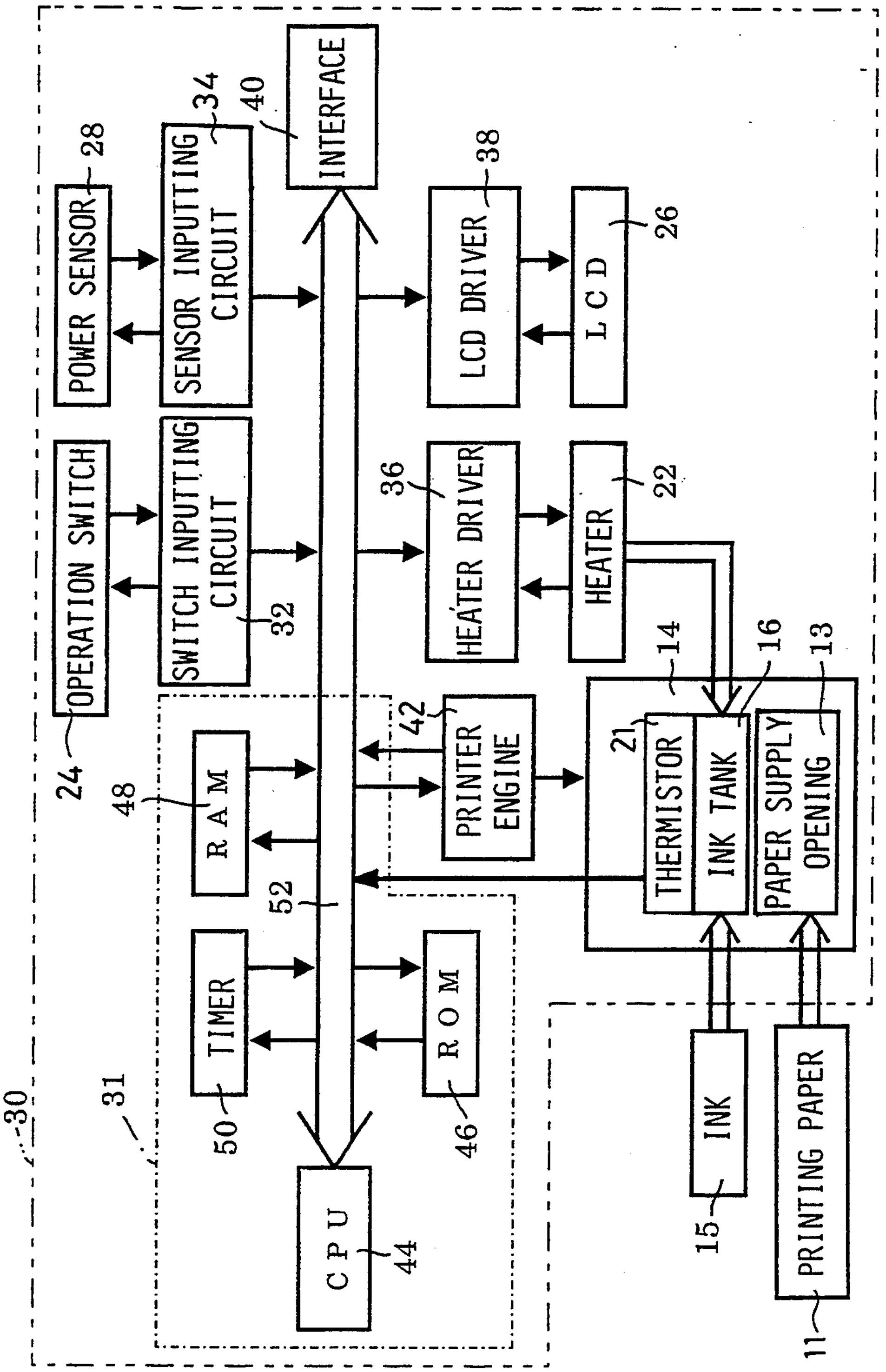
FIG. 2 is a block diagram illustrating an electrical structure of a control system including a timer in the ink jet printer in the first preferred embodiment according to the invention.

Each ink tank 16 is provided with a heater 22 (see FIG. 2). As shown in FIG. 2, the heater 22 is connected through a heater driver 36 to a control section 31. In a power connected condition, the solid ink 15 thus supplied is heated by the heater 22 and is molten in the ink tank 16, while in a power disconnected condition, heating of the ink 15 by the heater 22 is stopped, so that the ink 15 kept melted by residual or stored heat dissipates that heat to gradually solidify.

The power connected condition connotes a condition where an alternating current from a commercial power source 17 is supplied to a rectifier section 19 as will be hereinafter described. That is, the power connected condition implies a condition where a power plug (not shown) of the ink jet printer 10 is inserted in a plug socket of the commercial power source 17 and a power switch SW of the ink jet printer 10 is on.

In contrast, the power disconnected condition connotes a condition where the alternating current from the commercial power source 17 is not supplied to the rectifier section 19. That is, the power disconnected condition implies a condition where the power plug of the ink jet printer 10 is not inserted in the plug socket of the commercial power source 17 or the power switch SW of the ink jet printer 10 is OFF even when the power plug is inserted in the plug socket of the commercial power source 17. Further, each ink tank 16 is provided with a thermistor 21 for detecting the temperature of the ink tank 16 and outputting a detection signal to the control section 31. The ink tanks 16 constitute the ink storing means according to the invention.

Figure 3:
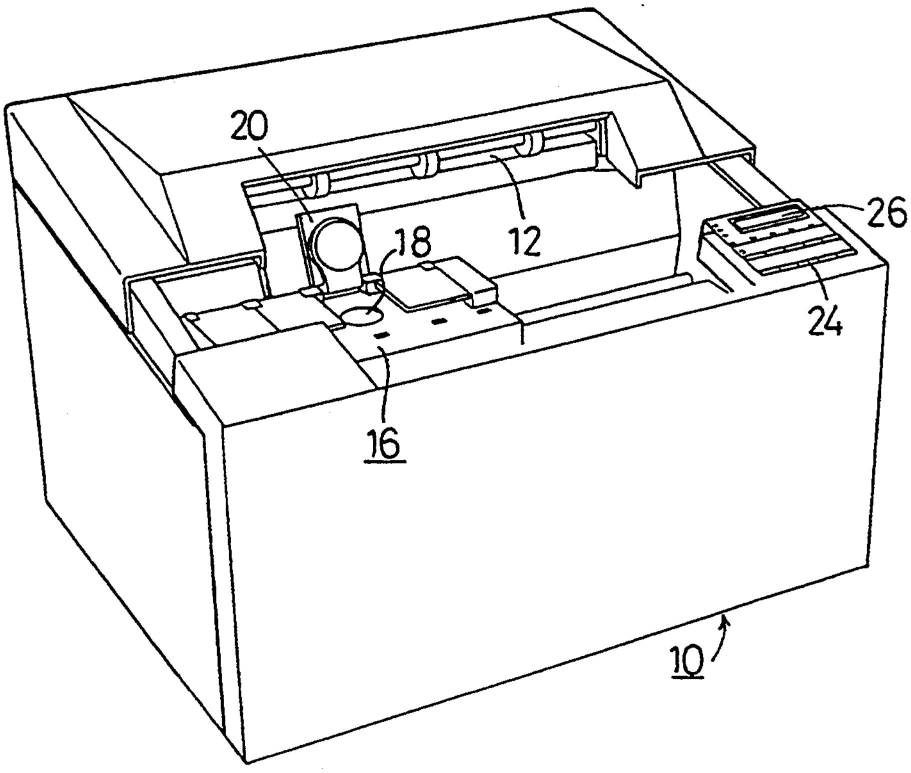
FIG. 3 is a perspective view of the ink jet printer in the first preferred embodiment according to the invention.

Various operation switches 24 are provided at a right upper portion of the ink jet printer 10 before the paper eject opening 12 as viewed in FIG. 3. Further, a liquid crystal display (which will be hereinafter referred to as LCD) 26 for displaying various messages is provided behind the operation switches 24. The LCD 26 serves to display a message that the ink 15 in the ink tank 16 is in a molten state and information indicative of other conditions of the ink jet printer 10. The LCD 26 constitutes the warning means according to the invention.

The electrical structure of the ink jet printer 10 in the first preferred embodiment will be described with reference to FIGS. 1 and 2. The ink jet printer 10 in this preferred embodiment is adapted to be connected to the commercial power source 17 so that electric power is supplied from the commercial power source 17 to the ink jet printer 10. The alternating current supplied from the commercial power source 17 is first rectified by the rectifier section 19 employing a known rectifier circuit and is converted into a direct current. The direct current is then supplied to a backup power source 29 and a control system 30 which are connected in parallel to the rectifier section 19.

The backup power source 29 is a secondary lithium (Li) battery. In the power connected condition of the ink jet printer 10, the electric power charges the backup power source 29, while in the power disconnected condition, electric power stored in the backup power source 29 is supplied to the control system 30.

The control system 30 includes a control section 31 as the control means, a power sensor 28, the LCD 26 as the warning means, the ink tank 16 as the ink storing means, various driver circuits, an interface 40, and a bus 52 connecting these components.

A switch inputting circuit 32, a sensor inputting circuit 34, the heater driver 36, a LCD driver 38, the interface 40, and a printer engine 42 are connected through the bus 52 to the control section 31. The operation switches 24 are connected to the switch inputting circuit 32, and the power sensor 28 is connected to the sensor inputting circuit 34. Further, the heater 22 is connected to the heater driver 36, the LCD 26 is connected to the LCD driver 38 and the printing mechanism 14 is connected to the printer engine 42. The control section 31 comprises a CPU (central processing unit) 44, a ROM (read-only memory) 46, a RAM (random access memory) 48 and a timer 50. These components are connected together through the bus 52. The control section 31 processes data input from the switch inputting circuit 32, the sensor inputting circuit 34, the interface 40 and the printer engine 42, and outputs data to the heater driver 36, the LCD driver 38, the interface 40 and the printer engine 42.

According to the input data from the switch inputting circuit 32, the interface 40 and the printer engine 42, the control section 31 controls operation of the various drivers and the printer engine 42 displaying messages by the LCD 26, heating of the ink 15 by the heater 22 and printing on the printing paper 11 by the printing mechanism 14. Further, according to the input data from the sensor inputting circuit 34, the control section 31 controls the LCD 26 through the LCD driver 38 for a predetermined period of time.

To effect this control, the power sensor 28 continuously detects whether or not the ink jet printer 10 is in the power connected condition, and continuously inputs the result of that detection, through the sensor inputting circuit 34, to the CPU 44. Further, the timer 50 is provided with a memory and time data previously stored in the ROM 46 is set in the memory of the timer 50. When a period of time corresponding to the time data set in the memory of the timer 50 has elapsed, the timer 50 outputs a predetermined signal to the CPU 44. The time data corresponds to a period of time from stoppage of heating of the ink 15 by the heater 22 to solidification of the ink 15. This time data is based on the capacity of the ink tank 16.

In this preferred embodiment, the ink tank 16 has a capacity of 70 ml. Therefore the time data corresponding to a period of time (about 30 minutes) until 70 ml of the molten ink 15 in the ink tank 16 solidifies is prestored in the ROM 46 and it is this time data that is set in the timer 50.

Further, there is also stored in the ROM 46 a program to be executed by the CPU 44 according to the data input from the power sensor 28 when the power connected condition of the ink jet printer 10 is changed to the power disconnected condition.

The operation of the ink jet printer 10 according to the first preferred embodiment will be described with reference to FIGS. 1 to 3. When the discussion describes an ink tank 16 or one ink tank 16 the comments apply to all ink tanks 16.

First, the user supplies an adequate amount of the solid ink 15 into the ink tank 16 and connects the ink jet printer 10 to the commercial power source 17. When the user turns the power switch SW on, the control section 31 drives the heater driver 36 to energize the heater 22 and thereby heat the ink 15 in the ink tank 16. Further, the control section 31 drives the LCD driver 38 to display a message of "PLEASE WAIT" on the LCD 26 thereby telling the user to wait for use of the printer until the ink 15 has been melted into a printable condition. When the ink 15 is melted is detected by the thermistor 21 provided in the ink tank 16. The thermistor 21 continuously detects the temperature of the ink tank 16 and outputs a detection signal to the control section 31. When the output signal from the thermistor 21 indicates that the temperature of the ink tank 16 is at a predetermined temperature, that is, a signal indicating that the ink 15 has melted and is printable, the control section 31 controls the LCD 26 to display information of a print format and waits for the input of image data or the like from the interface 40.

Figure 4:
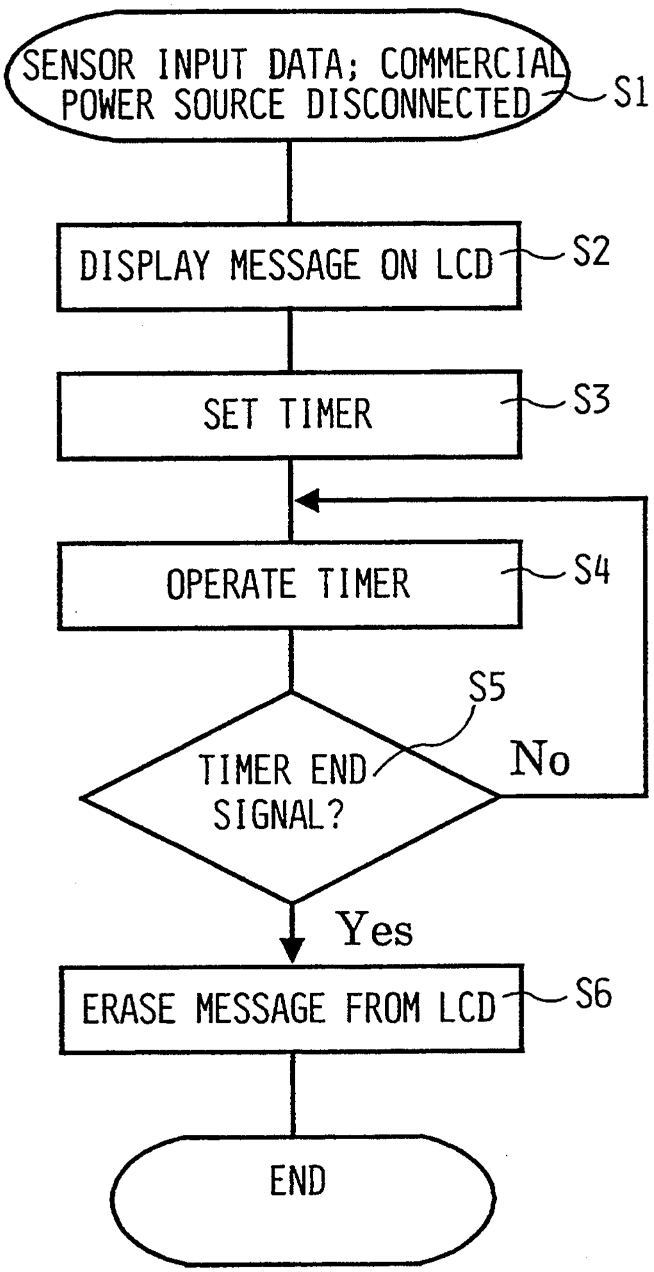
FIG. 4 is a flowchart illustrating the processing executed by a control section, with the use of the timer, in the ink jet printer in the first preferred embodiment according to the invention.

When the image data, consisting of characters, symbols, etc. is input from the interface 40, the control section 31 converts the image data into dot data, to be printed on the printing paper 11, and outputs the dot data to the printer engine 42. When the printer engine 42 receives the dot data, it feeds the printing paper 11, sheet by sheet, from the paper supply opening 13, and controls operation of the printing mechanism 14 to print the images of the characters, symbols, etc. on the printing paper 11 according to the dot data. After the printing is ended, the user turns the power switch SW off or disconnects the ink jet printer 10 from the commercial power source 17. Accordingly, the power sensor 28 outputs a signal indicating that the ink jet printer 10 is in the power disconnected condition through the sensor inputting circuit 34 to the CPU 44. At this time, the backup power source 29, previously charged by the commercial power source 17, supplies electric power to the control system 30. Then, the control section 31 starts processing according to the program stored in the ROM 46. The processing executed by the control section 31 will be described with reference to FIG. 4.

First, when the signal indicative of the power disconnected condition is input from the power sensor 28, through the sensor inputting circuit 34, to the CPU 44, the processing in the power disconnected condition is started (step 1, which will be hereinafter referred to as "S1"; and such reference will apply similarly to other steps appearing in the following description). When the processing is started, the CPU 44 first drives the LCD driver 38 to display a message of "INK IS MOLTEN" (S2). Then, the CPU 44 reads the time data, in this example it is 30 minutes, from the ROM 46 and sets this time data in the memory of the timer 50 (S3). The CPU 44 then drives the timer 50 to start measurement of time (S4). Output data from the timer 50 is input into the CPU 44, and the CPU 44 determines whether 30 minutes have elapsed according to the output data from the timer 50 (S5).

If the output data indicating that 30 minutes have elapsed is not input from the timer 50 to the CPU 44 (S5: No), the CPU 44 continues to drive the LCD driver 38 to display the message of "INK IS MOLTEN" on the LCD 26 and returns the program to S4 to continue the operation of the timer 50. If the output data indicating that 30 minutes have elapsed is input from the timer 50 to the CPU 44 (S5: Yes), the CPU 44 determines that 30 minutes have elapsed and stops the operation of the timer 50. Further, the CPU 44 erases the message of "INK IS MOLTEN" displayed on the LCD 26 through the LCD driver 38 (S6). Then, the control section 31 ends the processing. At this time, the consumption of electric power supplied from the backup power source 29 is ended.

Figure 5:
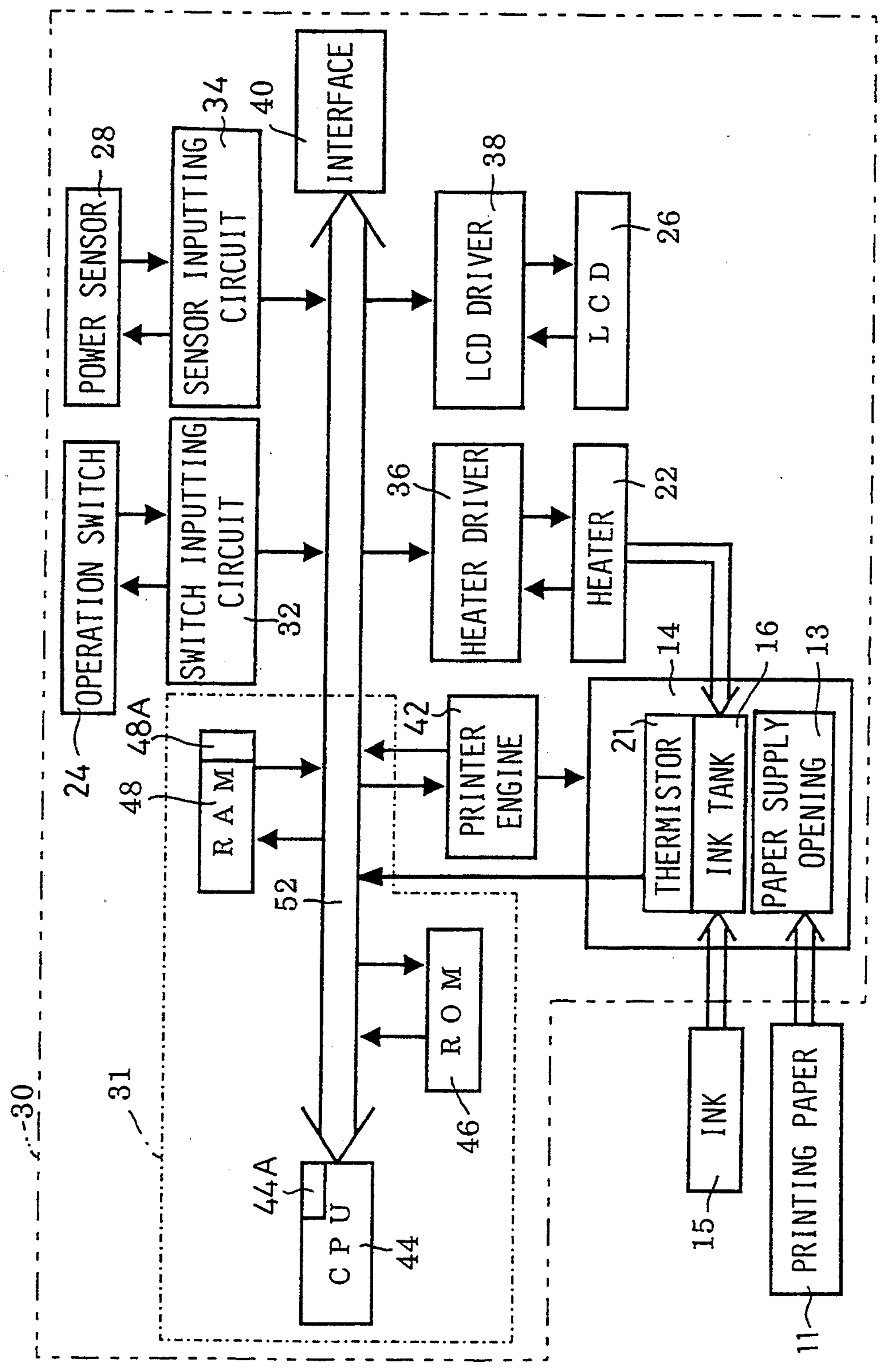
FIG. 5 is a block diagram illustrating an electrical structure of a control system including an oscillator in the ink jet printer in the first preferred embodiment according to the invention.
Figure 6:
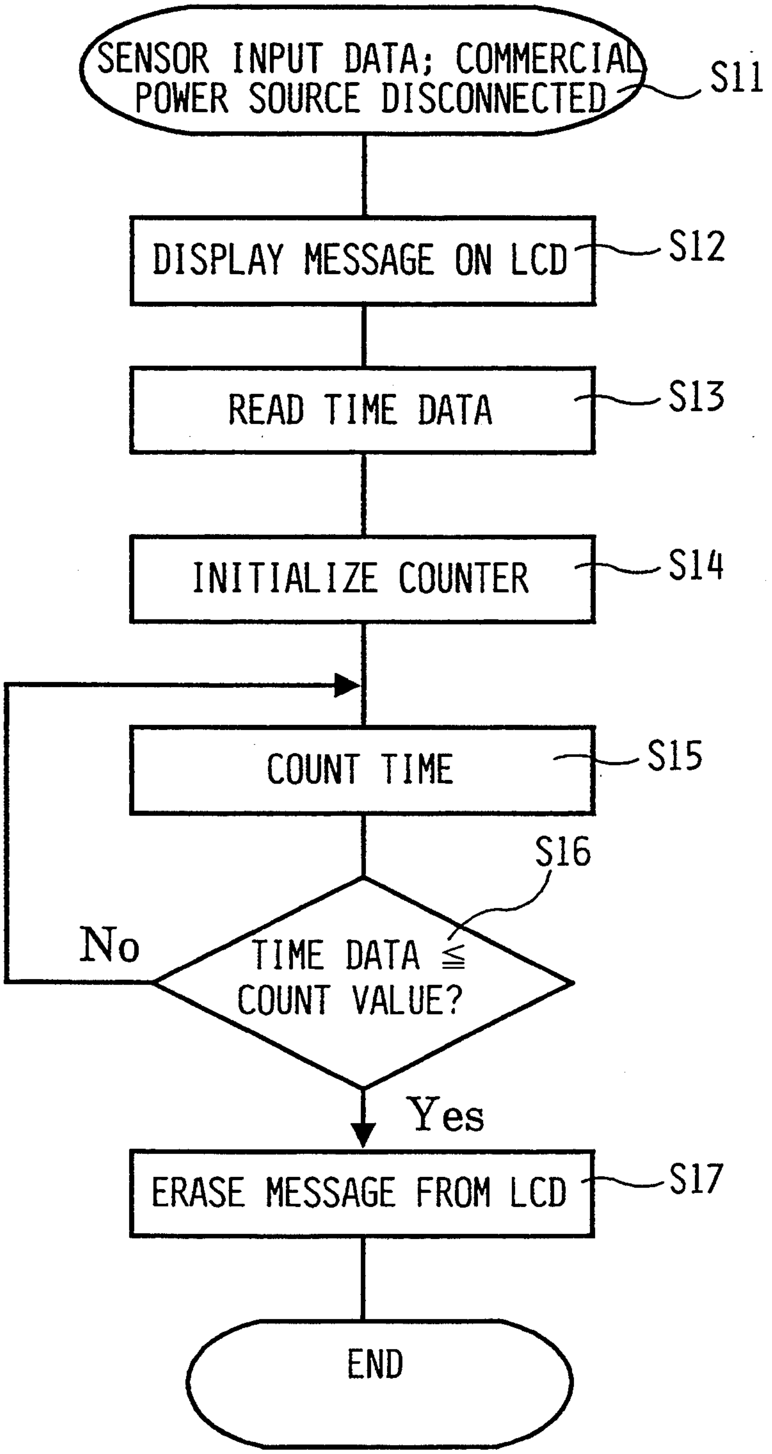
FIG. 6 is a flowchart illustrating the processing executed by a control section, with the use of a counter, in the ink jet printer in the first preferred embodiment according to the invention.

In the first preferred embodiment described above, the control section 31 includes the timer 50. The control section 31 provides the warning display based on the timer 50 timing a predetermined period of time from when the ink jet printer 10 has been disconnected from the outside power source. However, as a modification, an oscillator 44A, included in the CPU 44, may be used to substitute for the timer 50. This modification, the ink jet printer 10 in the first preferred embodiment driven by the control section 31 but excluding the timer 50, will be described with reference to FIGS. 5 and 6.

In this embodiment, the oscillator 44A continuously generates a pulse signal at a predetermined cycle. The CPU 44 counts the number of pulses of the pulse signal generated from the oscillator 44A using an addition function. The number of pulses thus counted, by the CPU 44, is stored into a counter use area 48A in the RAM 48. The time data of 30 minutes is stored in the ROM 46. The CPU 44 reads the time data from the ROM 46 and the count number of pulses from the counter use area 48A in the RAM 48, and compares the time data with the count number of pulses to measure the time. Accordingly, the counter comprises the CPU 44, the oscillator 44A included in the CPU 44, the ROM 46 and the RAM 48.

In operation, when the signal indicative of the power disconnected condition is input from the power source 28 through the sensor inputting circuit 34 into the CPU 44, the processing in the power disconnected condition is started (S11). When the processing is started, the CPU 44 drives the LCD driver 38 to display a message of "INK IS MOLTEN" on the LCD 26 (S12). Then, the CPU 44 reads the time data of 30 minutes from the ROM 46 (S13). Further, the CPU 44 initializes a count value stored in the counter use area 48A of the RAM 48 (S14). Then, the CPU 44 counts the number of pulses of the pulse signal generated from the oscillator 44A, by using an addition function, and stores the number of pulses thus counted into the counter use area 48A (S15). Then, the CPU 44 compares the time data read from the ROM 46 with the count value stored in the counter use area 48A and determines whether or not the count value is equal to or greater than the time data (S16). If the count value is less than the time data (S16: No), the CPU 44 returns the program to S15 to continue to add the number of pulses to the count value stored in the counter use area 48A and change the present count value. Further, at this time, the CPU 44 continues to drive the LCD driver 38 to display the message of "INK IS MOLTEN". If the count value is equal to or greater than the time data (S16: Yes), the CPU 44 erases the message of "INK IS MOLTEN" displayed on the LCD 26 (S17) and the CPU 44 ends the processing. At this time, the consumption of the electric power supplied from the backup power source 29 is ended.

In this modification of the first preferred embodiment, since the timer 50 is not used, but the oscillator 44A included in the CPU 44 is used as a substitute for the timer 50, the ink jet printer 10 can be manufactured at a low cost and with a small size.

According to the processing described above, the message of "INK IS MOLTEN" is displayed on the LCD 26 for about 30 minutes so that the user can confirm that the ink 15 in the ink tank 16 is still molten. Accordingly, the user can recognize that the ink jet printer 10 must not be moved for the period of time. In contrast, when this period of time has elapsed, the message of "INK IS MOLTEN" displayed on the LCD 26 is erased, and the user can confirm that the ink 15 has solidified. Accordingly, the user can recognize that the ink let printer 10 may be moved as required. In this manner, it is possible to prevent a malfunction or failure of the ink jet printer 10 due to the possibility that the user erroneously moved the ink jet printer 10 with the ink 15 in the ink tank 16 remaining still molten to cause spilling of the liquid ink 15 from the ink tank 16.

Figure 7:
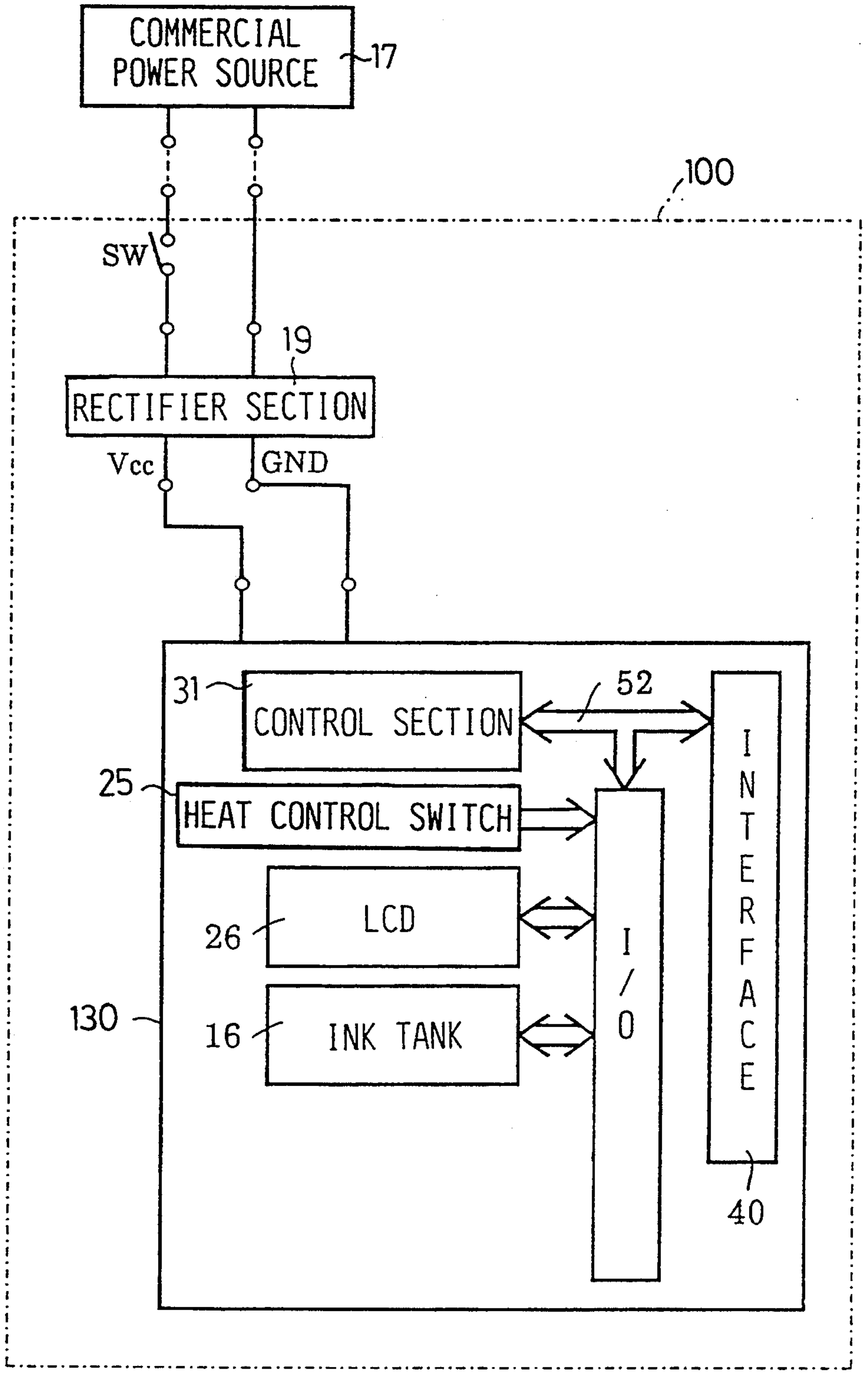
FIG. 7 is a block diagram illustrating an electrical structure of an ink jet printer in a second preferred embodiment according to the invention.
Figure 8:
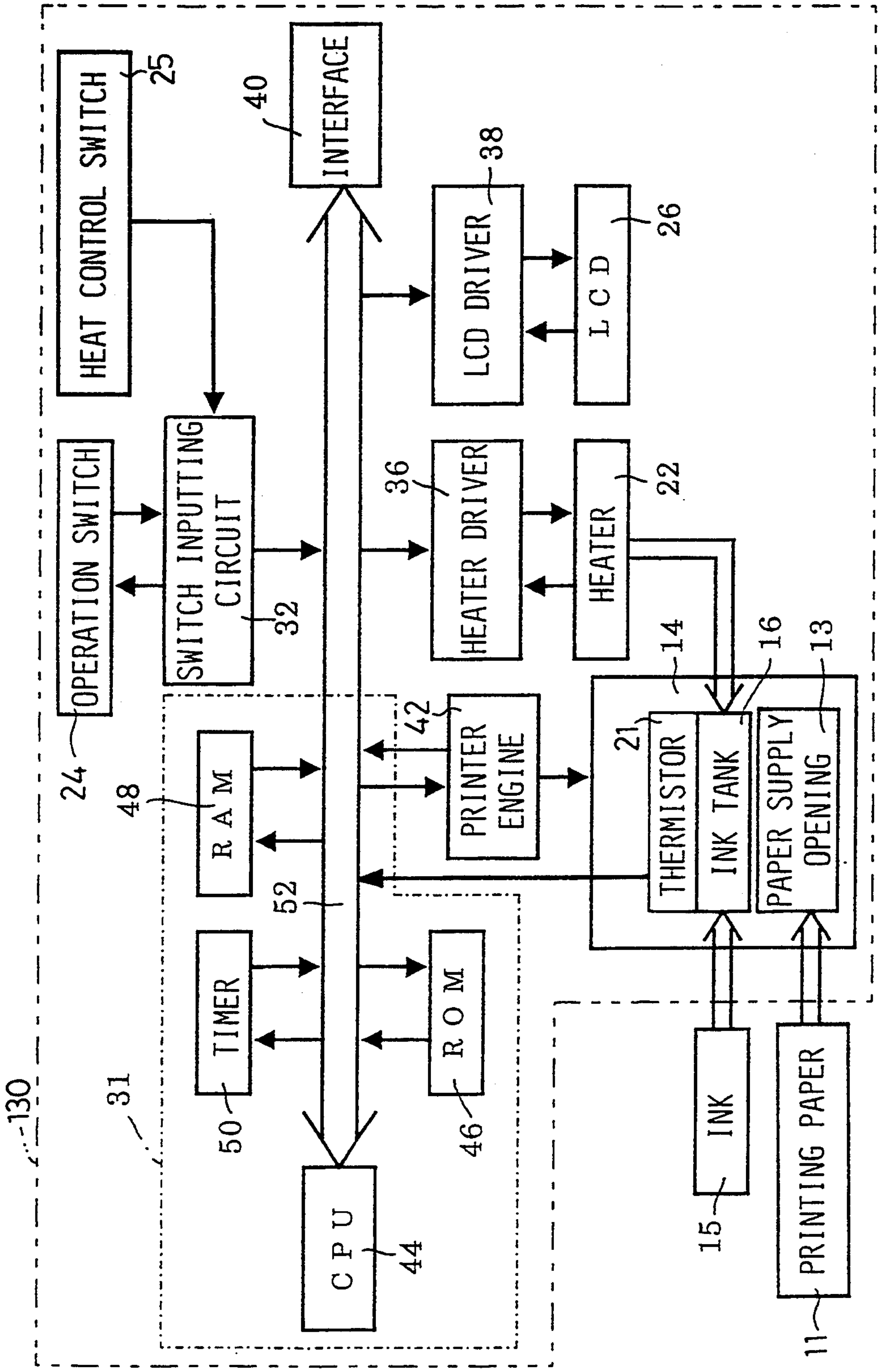
FIG. 8 is a block diagram illustrating an electrical structure of a control system including a timer in the ink jet printer in the second preferred embodiment according to the invention.

Now, a structure of an ink jet printer 100 in a second preferred embodiment according to the invention will be described with reference to FIGS. 7 to 9.

As the external construction of the ink jet printer 100 is the same as that of the ink jet printer 10 in the first preferred embodiment except for an aspect to be discussed below, the explanation of the same parts will be omitted and the same parts are designated by the same reference numerals.

Figure 9:
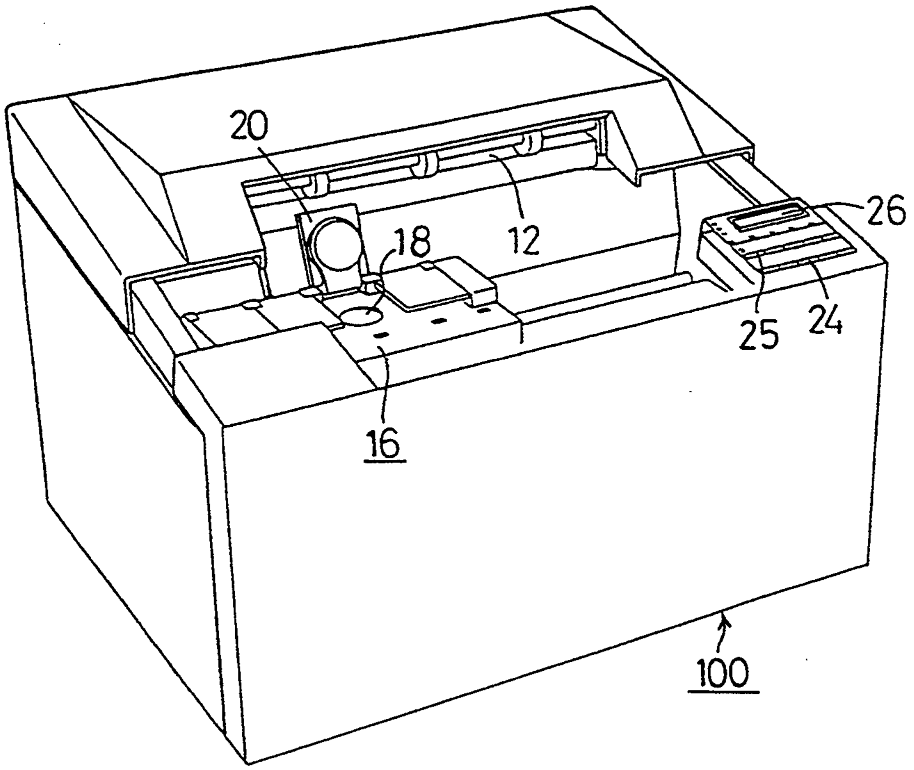
FIG. 9 is a perspective view of the ink jet printer in the second preferred embodiment according to the invention.

Various operation switches 24 and a heat control switch 25 are provided at a right upper portion of the ink jet printer 100 in front of the paper eject opening 12 as viewed in FIG. 9. The LCD 26 for displaying various messages is provided behind the operation switches 24 and the heat control switch 25.

The electrical structure of the ink jet printer 100 in the second preferred embodiment will be described with reference to FIGS. 7 and 8. The ink jet printer 100 in this preferred embodiment is adapted to be connected to a commercial power source 17 so that electrical power is supplied from the commercial power source 17 to the ink jet printer 100. The alternating current supplied from the commercial power source 17 is first rectified by a rectifier section 19 employing a known rectifier circuit and is converted into a direct current. The direct current is then supplied to a control system 130.

The control system 130 comprises a control section 31 as the control means, the heat control switch 25 as the heat control means, the LCD 26 as the warning means, an ink tank 16 as the ink storing means, various driver circuits, an interface 40, and a bus 52 connecting these components.

A switch inputting circuit 32, a heater driver 36, an LCD driver 38, the interface 40, and a printer engine 42 are connected through the bus 52 to the control section 31. The operation switches 24 and the heat control switch 25 are connected to the switch inputting circuit 32. Further, the heater 22 is connected to the heater driver 36, the LCD 26 is connected to the LCD driver 38 and a printing mechanism 14 is connected to the printer engine 42. When the heat control switch 25 is ON, the control section 31 stops energization of the heater 22 and when the heat control switch 25 is OFF, the control section 31 energizes the heater 22.

The control section 31 comprises a CPU 44, a ROM 46, a RAM 48, and a timer 50. These components are connected together through the bus 52. The control section 31 processes data input from the switch inputting circuit 32, the interface 40 and the printer engine 42 and outputs data to the heater driver 36, the LCD driver 38, the interface 40 and the printer engine 42. According to the data input from the switch inputting circuit 32, the interface 40 and the printer engine 42, the control section 31 controls operation of the various drivers and the printer engine 42 to carry out the display of messages by the LCD 26, heating of the ink 15 by the heater 22, and printing on the printing paper 11 by the printing mechanism 14.

Further, the timer 50 is provided with a memory and time data previously stored in the ROM 46 is set in the memory of the timer 50. When a period of time corresponding to the time data set in the memory of the timer 50 has elapsed, the timer 50 outputs a predetermined signal to the CPU 44. The time data corresponds to a period of time from stoppage of heating of the ink 15 by the heater 22 to solidification of the ink 15. This time data is primarily based on the capacity of the ink tank 16. In this preferred embodiment, the ink tank 16 has a capacity of 70 ml. Therefore, the time data corresponding to a period of time (about 30 minutes) until 70 ml of the ink 15 molten in the ink tank 16 solidifies is stored in the ROM 46 and this time data is set in the timer 50. Further, there is also stored in the ROM 46 a program to be executed by the CPU 44 when the heat control switch 25 is turned on. The control section 31 constitutes the control means according to the invention.

The operation of the ink jet printer 100 according to the second preferred embodiment is as described below.

First, the user supplies an adequate amount of the solid ink 15 to the ink tank 16 and connects the ink jet printer 100 to the commercial power source 17. When the user turns the power switch SW on, the control section 31 drives the heater driver 36 to energize the heater 22 to heat the ink 15 in the ink tank 16. Further, the control section 31 drives the LCD driver 38 to display a message of "PLEASE WAIT" on the LCD 26 and thereby tells the user wait for use of the printer until the ink 15 has been melted so as to be printable. When the ink 15 has melted, the condition is detected by the thermistor 21 provided in the ink tank 16. The thermistor 21 continuously detects the temperature of the ink tank 16 and outputs a detection signal to the control section 31. When the output signal from the thermistor 21 is a signal indicating that the temperature of the ink tank 16 is a predetermined temperature, that is, a signal indicating that the ink 15 has been melted so as to be printable, the control section 31 controls the LCD 26 to display information of a print format and waits for the input of image data or the like from the interface 40.

Figure 10:
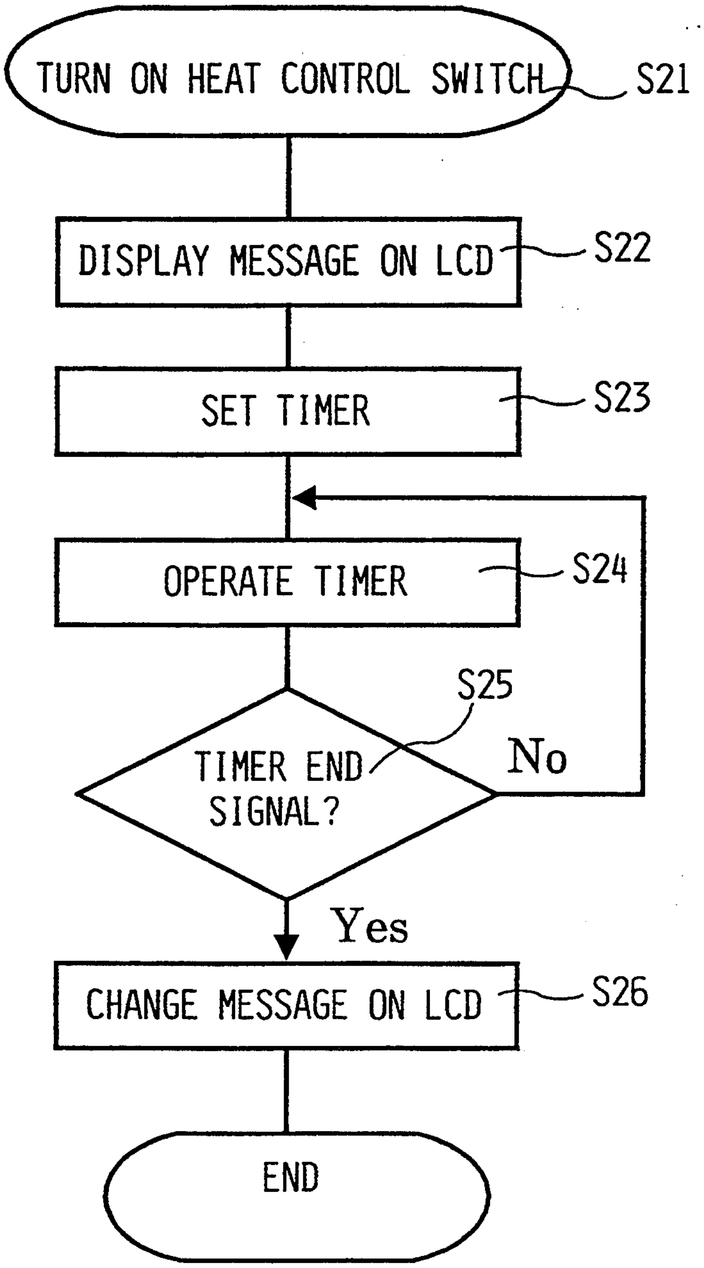
FIG. 10 is a flowchart illustrating the processing executed by a control section, with the use of the timer, in the ink jet printer in the second preferred embodiment according to the invention.

When the image data, consisting of characters, symbols, etc., is input from the interface 40, the control section 31 converts the image data into dot data, to be printed on the printing paper 11, and outputs the dot data to the printer engine 42. When the printer engine 42 receives the dot data, it feeds the printing paper 11, one page at a time, from the paper supply opening 13 and controls operation of the printing mechanism 14 to print the image of characters, symbols, etc. on the printing paper 11 according to the dot data. After the printing is complete, the user turns the heat control switch 25 on to stop the energization of the heater 22. Then, the control section 31 starts processing according to the program stored in the ROM 46. The processing to be executed by the control section 31 will be described with reference to FIG. 10.

First, when the heat control switch 25 is turned on to stop the energization of the heater 22, the processing is started (S21). When the processing is started, the CPU 44 first drives the LCD driver 38 to display a message of "INK IS MOLTEN" (S22). Then, the CPU 44 reads the time data of 30 minutes from the ROM 46, and sets this time data in the memory of the timer 50 (S23). The CPU 44 then drives the timer 50 to start measurement of time (S24). Output data from the timer 50 is input into the CPU 44, and the CPU 44 determines whether or not 30 minutes have elapsed according to the output data from the timer 50 (S25). If the output data indicating that 30 minutes have elapsed is not input from the timer 50 to the CPU 44 (S25: No), the CPU 44 continues to drive the LCD driver 38 to display the message of "INK IS MOLTEN" on the LCD 26, and returns the program to S24 to continue the operation of the timer 50. If the output data indicating that 30 minutes have elapsed is input from the timer 50 to the CPU 44 (S25: Yes), the CPU 44 determines that 30 minutes have elapsed, and stops the operation of the timer 50. Further, the CPU 44 changes the message of "INK IS MOLTEN" displayed on the LCD 26 through the LCD driver 38 into a message of "PRINTER MAY BE MOVED" (S26). Then, the control section 31 ends the processing.

In the second preferred embodiment mentioned above, the control section 31 includes the timer 50 and provides a warning display such that the message indicating that the printer must not be moved is displayed on the LCD 26, based on the timer 50 and a predetermined period of time from the time when the heat control switch 25 has been turned on. Alternatively, a message indicating that the printer may be moved is displayed on the LCD 26 after the predetermined period of time has elapsed.

Figure 11:
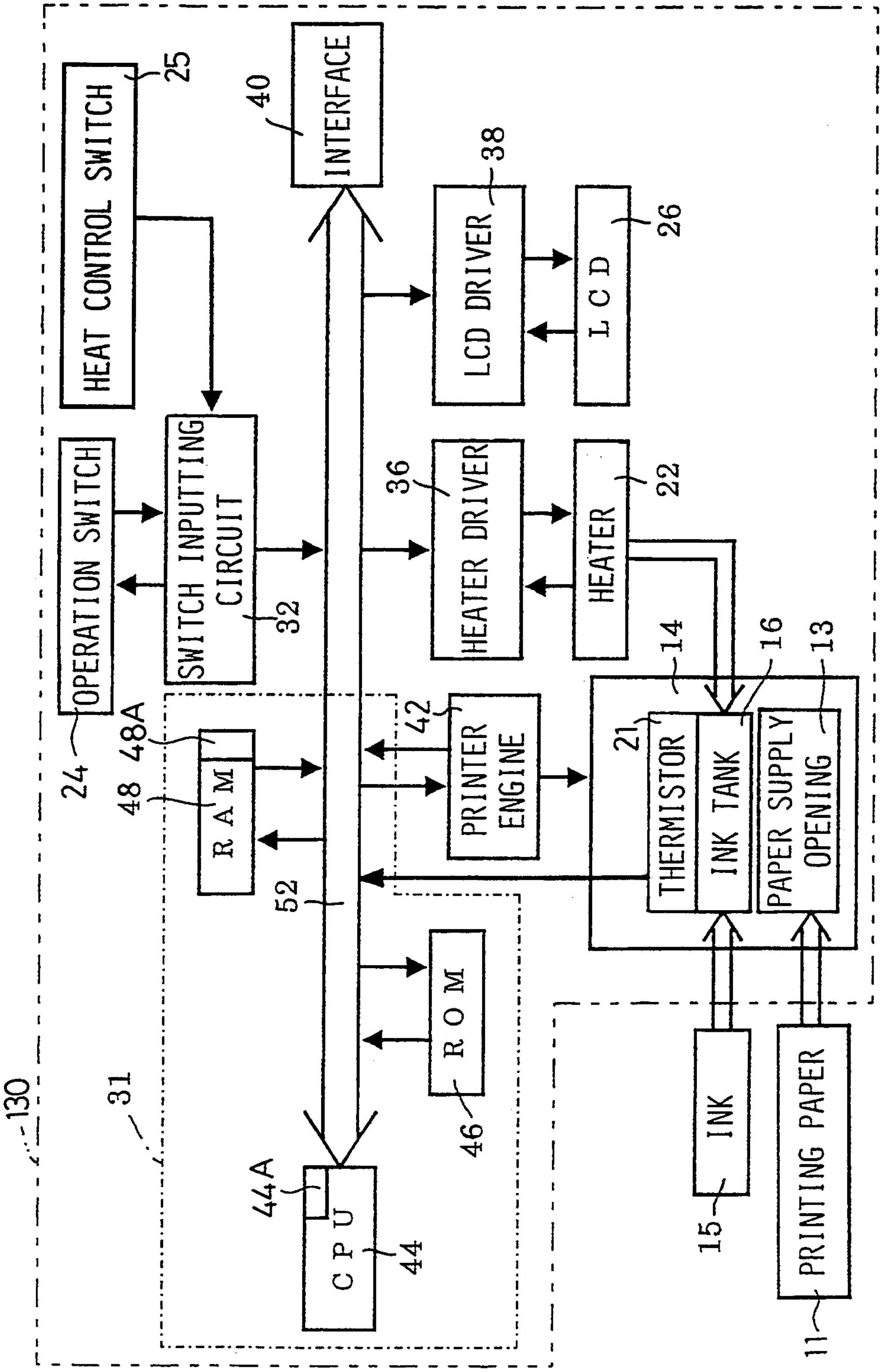
FIG. 11 is a block diagram illustrating an electrical structure of a control system including an oscillator in the ink jet printer in the second preferred embodiment according to the present invention.
Figure 12:
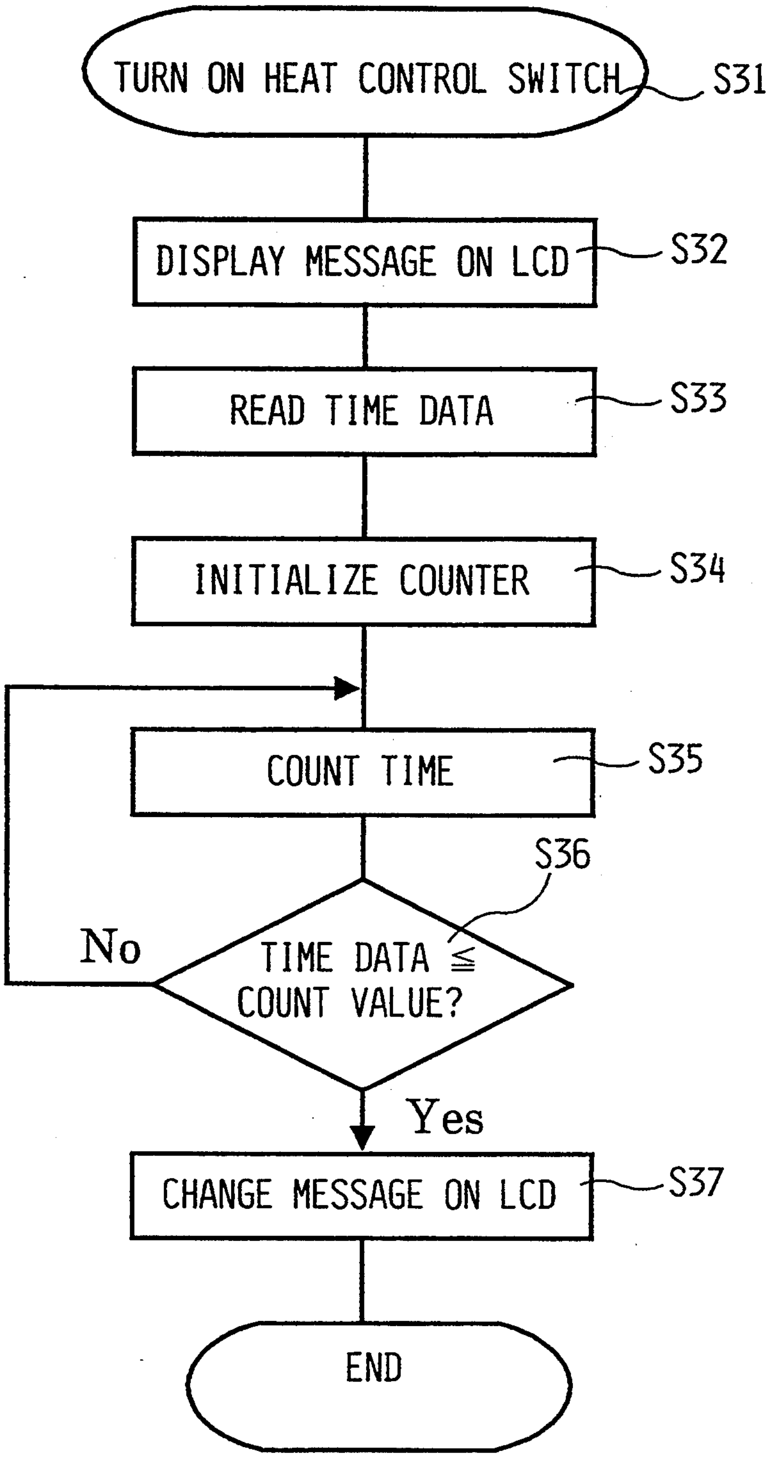
FIG. 12 is a flowchart illustrating the processing executed by a control section, with the use of a counter, in the ink jet printer in the second preferred embodiment according to the invention.

As a modification, an oscillator 44A, included in the CPU 44, may be used to substitute for the timer 50. This modification of the ink jet printer 100, according to the second preferred embodiment, is driven by the control section 31 and will be described with reference to FIGS. 11 and 12.

In this sub-embodiment, the oscillator 44A always generates a pulse signal at a predetermined cycle and the CPU 44 counts the number of pulses of the pulse signal generated from the oscillator 44A, by using an addition function. The number of pulses counted by the CPU 44 are stored in a counter use area 48A in the RAM 48. The CPU 44 reads the previously stored time data of 30 minutes from the ROM 46 and the count number of pulses from the counter use area 48A in the RAM 48, and compares the time data with the count number of pulses to measure the passage of time. Accordingly, a counter comprises the CPU 44, the oscillator 44A included in the CPU 44, the ROM 46 and the RAM 48.

In operation, when the heat control switch 25 is turned on to stop the energization of the heater 22, the processing is started (S31). When the processing is started, the CPU 44 first drives the LCD driver 38 to display a message of "INK IS MOLTEN" on the LCD 26 (S32). Then, the CPU 44 reads the time data of 30 minutes from the ROM 46 (S33). Further, the CPU 44 initializes a count value stored in the counter use area 48A of the RAM 48 (S34). The CPU 44 then counts the number of pulses of the pulse signal generated from the oscillator 44A, by using an addition function, and stores the number of pulses thus counted into the counter use area 48A (S35). Then, the CPU 44 compares the time data read from the ROM 46 with the count value stored in the counter use area 48A and determines whether or not the count value is equal to or greater than the time data (S36). If the count value is less than the time data (S36: No), the CPU 44 returns the program to S35 to continue to add the number of pulses to the count value stored in the counter use area 48A and change the present count value. Further, at this time, the CPU 44 continues to drive the LCD driver 38 to display the message of"INK IS MOLTEN". If the count value is equal to or greater than the time data (S36: Yes), the CPU 44 changes the message of "INK IS MOLTEN" displayed on the LCD 26 into a message of "PRINTER MAY BE MOVED" (S37). Then, the CPU 44 ends the processing.

In the second preferred embodiment, since the backup power source 29 used in the first preferred embodiment need not be provided, the ink jet printer 100 can be manufactured at a low cost and with a small size. Further, in the modification of the second preferred embodiment, since the timer 50 is not used, rather the oscillator 44A included in the CPU 44 is substituted for the timer 50, the ink jet printer 100 can be manufactured at a lower cost and with a smaller size.

According to the processing as mentioned above, the message of "INK IS MOLTEN" is displayed on the LCD 26 for about 30 minutes and the user can confirm that the ink 15 in the ink tank 16 is still molten. Accordingly, the user can determine that the ink jet printer 100 must not be moved for this period of time. In contrast, when this period of time has elapsed, the message of "INK IS MOLTEN" displayed on the LCD 26 is changed into the message of "PRINTER MAY BE MOVED" on the LCD 26, and the user can confirm that the ink 15 has solidified. Accordingly, the user can recognize that the ink jet printer 100 may be moved as required. In this manner, it is possible to prevent a malfunction or failure of the ink jet printer 100 due to the possibility that the user erroneously moves the ink jet printer 100 with the ink 15 in the ink tank 16 still molten and spills of the liquid ink 15 from the ink tank 16.

It is to be understood that the invention is not limited to the specific preferred embodiments described above, but various modifications may be made in the invention without departing from the spirit and scope thereof.

For instance, in the first and second preferred embodiments, the control section 31 performs the warning display such that the message of "INK IS MOLTEN" is displayed on the LCD 26 for a predetermined period of time while the ink 15 is kept molten after the stoppage of heating of the ink 15 by the heater 22. However, such a warning display may be performed by the control section 31 also for a period of time while the ink 15 is being heated by the heater 22.

Figure 13:
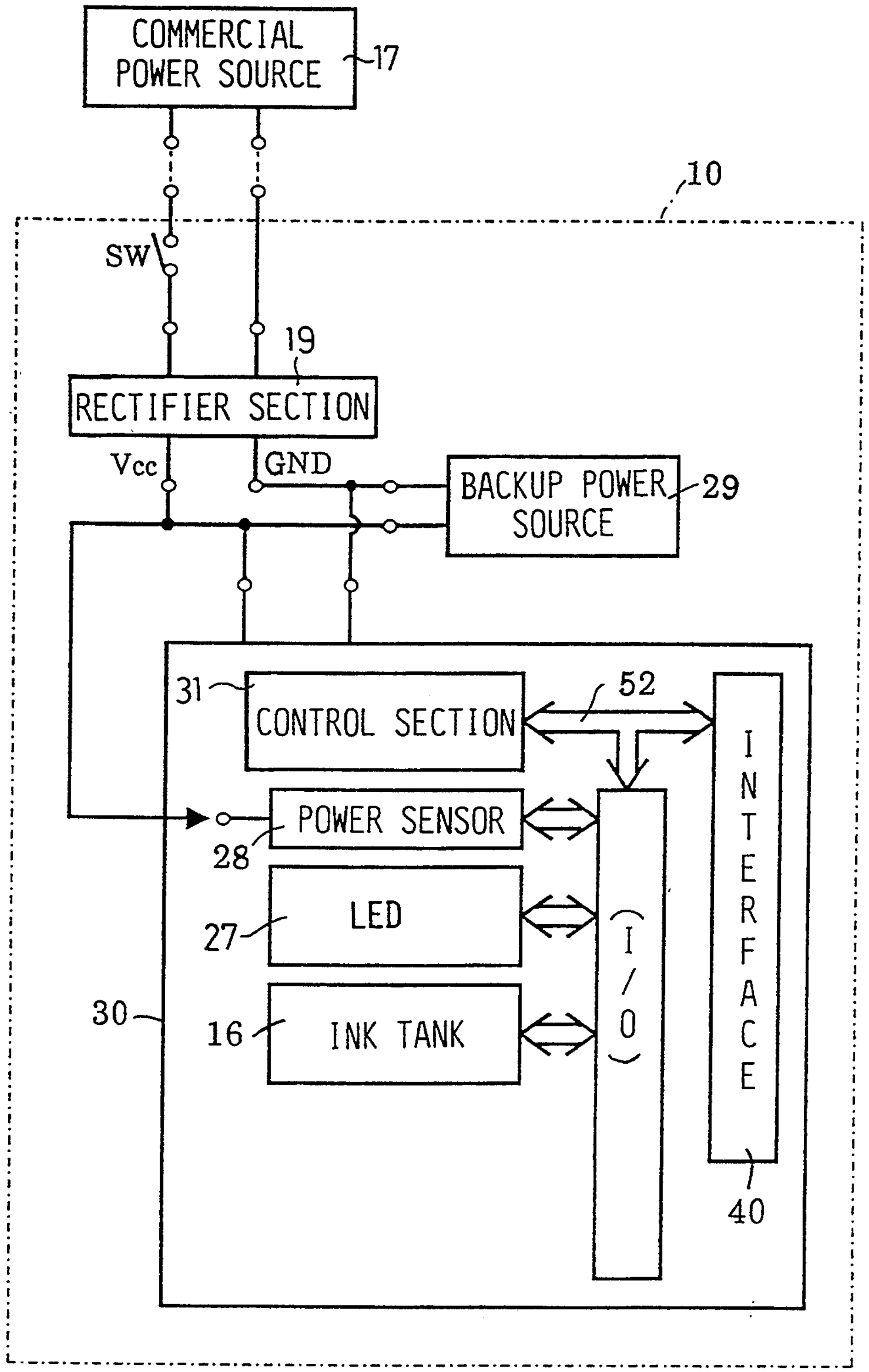
FIG. 13 is a block diagram illustrating another electrical structure of the ink jet printer in the first preferred embodiment according to the invention.

Further, in the first and second preferred embodiments, the LCD 26 may be replaced by an indicator lamp (e.g., a light emitting diode) 27 as a warning indicator as shown in FIG. 13. In this case, the indicator lamp 27 is lighted or flashed for a period of time while the ink 15 in the ink tank 16 is molten, thus giving warning to the user.

Further, in both the first and second preferred embodiments, the temperature of the ink 15 in the ink tank 16 as detected by the thermistor 21 may initiate the warning display according to the result of the temperature detection. More specifically, when the thermistor 21 outputs to the control section 31 a signal indicating that the temperature of the ink 15 is equal to or higher than a predetermined temperature (a melting point of the ink 15), the control section 31 determines that the ink 15 is in a molten state. In contrast, when the thermistor 21 outputs to the control section 31 a signal indicating that the temperature of the ink 15 is lower than the predetermined temperature, the control section 31 determines that the ink is in a solidified state. When the control section 31 determines that the ink 15 is in a molten state, the control section 31 performs the warning display as described.

Further, in the case of performing the time measurement using a counter in the first and second preferred embodiments where the counter comprises the CPU 44, the oscillator 44A included in the CPU 44, the ROM 46 and the RAM 48, the RAM 48 may be eliminated. In this case, while the number of pulses of the pulse signal generated from the oscillator 44A is counted by the CPU 44, the count number of pulses is not stored into the RAM 48, but is maintained in a latch circuit for comparison, with the time data read from the ROM 46 by the CPU 44, thus performing the time measurement.

Additionally, although the time data stored in the ROM 46 is 30 minutes in the first and second preferred embodiments, the time data is not limited to 30 minutes as it depends on the capacity of the ink tank 16 and to a lesser degree, the composition of the ink.

What is claimed is:

1. An ink jet printer for printing an image on a recording medium using an ink jet head and a hot melt ink which is solid at normal temperature and is melted by heat, comprising:

ink storing means for storing the hot melt ink, said ink string means having an opening for introducing unmelted hot melt ink into the ink storing means cover for the opening;

heating means thermally connected to said ink storing means for heating and melting the hot melt ink stored in said ink storing means;

warning means for warning a user that the melt ink stored in the ink storing means is molten;

clock means for timing a predetermined time period from a stoppage of heating of the hot melt ink by said heating means to solidification of the hot melt ink; and control means for operating said warning means for a period of time while the hot melt ink stored in the ink storing means is molten, wherein said control means ceases operating said warning means when said clock means has timed out the predetermined time period indicating the hot melt ink has resolidified and that movement of the ink jet printer is possible without a potential for spilling ink from the opening.

2. The ink jet printer according to claim 1, wherein said clock means comprises a timer outputting a signal to said control means when the predetermined time period has passed.

3. The ink jet printer according to claim 1, wherein said clock means comprises:

pulse generating means for continuously generating a pulse signal at a predetermined cycle;

adding means for adding a number of the pulse signals generated from said pulse generating means;

first memory means for storing a total number after adding the number of the pulse signals by said adding means; and second memory means for storing the predetermined time period which is from stoppage of heating of the hot melt ink by said heating means to solidification of the hot melt ink, wherein said control means clocks the predetermined time period by comparing the total number of the pulse signals stored in said first memory means and the predetermined time period stored in said second memory means.

4. The ink jet printer according to claim 1, wherein said clock means comprises:

pulse generating means for continuously generating a pulse signal at a predetermined cycle;

adding means for adding a number of the pulse signal generated at each cycle from said pulse generating means to a total at an immediately preceding cycle to obtain a total count; and memory means for storing the predetermined time period which is from stoppage of heating of the hot melt ink by said heating means to solidification of the hot melt ink, wherein said control means clocks the predetermined time period by comparing a current cycle total count and the predetermined time period stored in said memory means.

5. The ink jet printer according to claim 1, further comprising:

an interior power source provided in the ink jet printer main body and capable of being charged from a commercial power source, said interior power source supplying power when the power supplied from the commercial power source is interrupted; and power supply detecting means for detecting the power supply from the commercial power source and for outputting a signal when the power supplied from the commercial power source is interrupted, wherein said control means drives said clock means by the power supplied from said interior power source when said control means receives the signal output from said power supply detecting means.

6. The ink jet printer according to claim 1, further comprising heat control means for outputting a signal indicative of interrupting the heating of said heating means, said control means driving said clock means by the power supplied from said commercial power source when said control means receives the signal output from said heat control means.

7. The ink jet printer according to claim 1, wherein said warning means comprises a liquid crystal display, said liquid crystal display displaying a message indicating the ink is molten.

8. The ink jet printer according to claim 1, wherein said warning means comprises a light emitting diode, said light emitting diode being a one of constantly lit or flashing when the hot melt ink is molten.

9. An ink jet printer for printing an image on a recording medium using an ink jet head and a hot melt ink which is solid at normal temperature and is melted by heat, comprising:

ink storing means for storing the hot melt ink, said ink storing means having an opening for introducing unmelted hot melt ink into the ink storing means and a cover for the opening;

heating means thermally connected to said ink storing means for heating and melting the hot melt ink stored in said ink storing means;

warning means for warning a user that the hot melt ink stored in the ink storing means is molten;

temperature detecting means for detecting a temperature of the hot melt ink and for outputting a temperature detecting signal;

control means for operating said warning means for a period of time while the hot melt ink stored in the ink storing means is molten, wherein said control means drives said warning means when a temperature of the hot melt ink is more than a melting point of the hot melt ink on a basis of the temperature detecting signal output from said temperature detecting means and ceases driving said warning means when the hot melt ink has resolidified indicating that movement of the ink jet printer is possible without a potential for spilling ink from the opening.

10. A warning device for an ink jet printer that prints an image on a recording medium using an ink jet head and a hot melt ink, the hot melt ink being solid at a normal temperature and is melted by a heater to provide heating means by applying heat to an ink storing means having an opening for supplying unmelted hot melt ink that is closed by a cover, the warning device comprising:

detecting means for detecting the hot melt ink is in a molten state, said detecting means comprising a clock means for timing a predetermined time period from a cessation of heating of the hot melt ink by the heating means to solidification of the hot melt ink;

warning means for warning a user that the hot melt ink is in the molten state; and control means for operating said warning means upon receipt of a signal from the detecting means that the ink is in the molten state following the cessation of heating by the heating means, wherein said control means ceases operating said warning means when the detecting means indicates the predetermined time has been timed out which indicates the hot melt ink has resolidified indicating that movement of the ink jet printer is possible without a potential for spilling ink from the opening.

11. The warning device according to claim 10, wherein the clock means comprises a timer outputting a signal to said control means when the predetermined time period has passed.

12. The warning device according to claim 10, wherein the clock means comprises:

pulse generating means for continuously generating a pulse signal at a predetermined cycle;

adding means for adding a number of pulse signals generated from said pulse generating means during each cycle;

first memory means for storing a total number of pulse signals after said adding means has added the number of pulse signals; and second memory means for storing the predetermined time period from the cessation of heating of the hot melt ink by the heating means to solidification of the hot melt ink, wherein the control means clocks the predetermined time period by comparing the total number of pulse signals stored in said first memory and the predetermined time period stored in said second memory means.

13. The warning device according to claim 10, wherein said clock means comprises:

pulse generating means for continuously generating a pulse signal at a predetermined cycle;

adding means for adding a number of pulse signals generated at each cycle by said pulse generating means to a total at an immediately preceding cycle to obtain a total count; and memory means for storing the predetermined time period from the cessation of heating of the hot melt ink by the heating means to solidification of the hot melt ink, wherein said control means clocks the predetermined time period by comparing a current cycle total count and the predetermined time period stored in said memory means.

14. The warning device according to claim 10, further comprising:

an interior power source capable of being charged from a commercial power source, the interior power source supplying power when power from the commercial power source is interrupted; and power supply detecting means for detecting the power supply from the commercial power source and for outputting the signal when the power supply from the commercial source is interrupted, wherein said control means drives the clock means using power supplied from the interior power source after the control means has received the signal output from the power supply detecting means.

15. The warning device according to claim 10, further comprising heat control means for outputting a signal indicative of an interruption of the heating by the heating means, said control means driving said clock means by power supplied from the commercial power source when said control means receives a signal output from said heat control means.

16. The warning device according to claim 10, said warning means comprises a liquid crystal display, said liquid crystal display displaying a message indicating the hot melt ink is molten.

17. The warning device according to claim 10, said warning means comprises a light emitting diode, said light emitting diode lighting or flashing when the hot melt ink is molten.

18. A warning device for an ink jet printer that prints an image on a recording medium using an ink let head and a hot melt ink, the hot melt ink being solid at a normal temperature and is melted by a heater applying heat to an ink storing means having an opening for supplying unmelted hot melt ink that is closed by a cover, the warning device comprising;

determining means for determining the hot melt ink is in a molten state;

warning means for warning a user that the hot melt ink is in the molten state;

temperature detecting means for detecting a temperature of the hot melt ink and outputting a temperature detecting signal;

control means for operating said warning means upon receipt of a signal from the determining means that the ink is in the molten state following cessation of heating by the heater, wherein the control means drives the warning means when a temperature of the ink is more than a melting point of the hot melt ink on a basis of the temperature detecting signal output from the temperature detecting means and an indication from a one of a power supply detecting means for detecting receipt of power from a commercial power source and a heat control means controlling a supply of commercial power to the heater that power is no longer supplied to the heater thereby indicating the hot melt ink has resolidified and that movement of the ink jet printer is possible without a potential for spilling ink from the opening.

* * * * *